United States Patent
Kinomura et al.

(10) Patent No.: US 9,434,257 B2
(45) Date of Patent: Sep. 6, 2016

(54) POWER SUPPLY CONNECTOR, VEHICLE AND CONTROL METHOD FOR VEHICLE

(75) Inventors: Shigeki Kinomura, Suntou-gun (JP); Tetsuhiro Ishikawa, Toyota (JP); Takahide Iida, Obu (JP); Takafumi Nishimuta, Obu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 388 days.

(21) Appl. No.: 14/241,523

(22) PCT Filed: Aug. 29, 2012

(86) PCT No.: PCT/IB2012/001665
§ 371 (c)(1),
(2), (4) Date: Feb. 27, 2014

(87) PCT Pub. No.: WO2013/030653
PCT Pub. Date: Mar. 7, 2013

(65) Prior Publication Data
US 2014/0232182 A1    Aug. 21, 2014

(30) Foreign Application Priority Data
Aug. 30, 2011    (JP) .................................. 2011-187332

(51) Int. Cl.
*B60L 1/00*    (2006.01)
*B60L 3/00*    (2006.01)
(Continued)

(52) U.S. Cl.
CPC .............. *B60L 1/006* (2013.01); *B60L 3/0069* (2013.01); *B60L 3/04* (2013.01); *B60L 11/123* (2013.01); *B60L 11/14* (2013.01); *B60L 11/1818* (2013.01); *B60L 11/1842* (2013.01); *B60L 11/1844* (2013.01); *B60L 11/1846* (2013.01); *B60L 2210/10* (2013.01); *B60L 2210/30* (2013.01); *B60L 2210/40* (2013.01); *B60L 2230/12* (2013.01); *Y02E 60/721* (2013.01); *Y02T 10/6217* (2013.01); *Y02T 10/7005* (2013.01); *Y02T 10/7011* (2013.01); *Y02T 10/7016* (2013.01); *Y02T 10/7022* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01);
(Continued)

(58) Field of Classification Search
CPC ........................................................ H02J 3/00
USPC ........................................................ 307/9.1
See application file for complete search history.

(56) References Cited

U.S. PATENT DOCUMENTS

2008/0185197 A1    8/2008    Nakamura et al.
2009/0102433 A1    4/2009    Kamaga
(Continued)

FOREIGN PATENT DOCUMENTS

EP    2056420 A1    5/2009
EP    2309617 A1    4/2011
(Continued)

*Primary Examiner* — Robert Deberadinis
(74) *Attorney, Agent, or Firm* — Kenyon & Kenyon LLP

(57) ABSTRACT

A power supply connector (410) is used to supply electric power from a hybrid vehicle (100) equipped with an engine (160) and a motor generator (130, 135) to a device outside of the vehicle (100). When the power supply connector (410) is connected to an inlet (220) of the vehicle (100), the power supply connector (410) outputs a signal for performing a power supply operation while allowing operation of the engine (160) to an ECU (300) of the vehicle (100).

21 Claims, 11 Drawing Sheets

(51) Int. Cl.
*B60L 3/04* (2006.01)
*B60L 11/12* (2006.01)
*B60L 11/14* (2006.01)
*B60L 11/18* (2006.01)
*H02J 3/00* (2006.01)

(52) U.S. Cl.
CPC ............ *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | |
|---|---|---|
| 2009/0192655 A1 | 7/2009 | Ichikawa et al. |
| 2010/0164287 A1 | 7/2010 | Komazawa et al. |
| 2011/0121779 A1 | 5/2011 | Ichikawa et al. |

FOREIGN PATENT DOCUMENTS

| | | |
|---|---|---|
| JP | 02-142329 A | 5/1990 |
| JP | 2006-020455 A | 1/2006 |
| JP | 2007-151214 A | 6/2007 |
| JP | 2009-106053 A | 5/2009 |
| JP | 2010-035277 A | 2/2010 |

FIG. 9

| POTENTIAL LEVEL (Vp) | CONNECTOR CONNECTION DETERMINATION | CONNECTOR FITTING DETERMINATION | OPERATING SWITCH (SW20,30) | CONNECTOR TYPE | EMERGENCY SWITCH (SW40) | WHETHER TO ALLOW ENGINE START | REMARK |
|---|---|---|---|---|---|---|---|
| HIGH V7 | NOT CONNECTED | | | | | | LINE BREAK DETERMINATION LEVEL |
| V6 | | NOT FITTED | | | | | NON-CONNECTION DETERMINATION (INLET RESISTANCE) |
| V5 | | | | | | | |
| V4 | CONNECTED | | OFF | | | | CONNECTOR HALF-FITTED STATE |
| V3 | | FITTED | ON | ONLY CHARGING OR CHARGING AND POWER SUPPLY | | STOPPED (START OF ENGINE IS PROHIBITED) | CHARGING CABLE OR CHARGING/POWER SUPPLY CABLE (CHARGING/POWER SUPPLY) ENGINE IS STOPPED |
| V2 | | | | CHARGING AND POWER SUPPLY | OFF | | CHARGING/POWER SUPPLY CABLE (POWER SUPPLY) ENGINE OPERATION IS ALLOWED |
| V1 | | | | ONLY POWER SUPPLY | ON | START OF ENGINE IS ALLOWED | POWER SUPPLY CABLE/POWER SUPPLY CONNECTOR |
| LOW 0 | | | | | | | GROUND-FAULT DETERMINATION LEVEL |

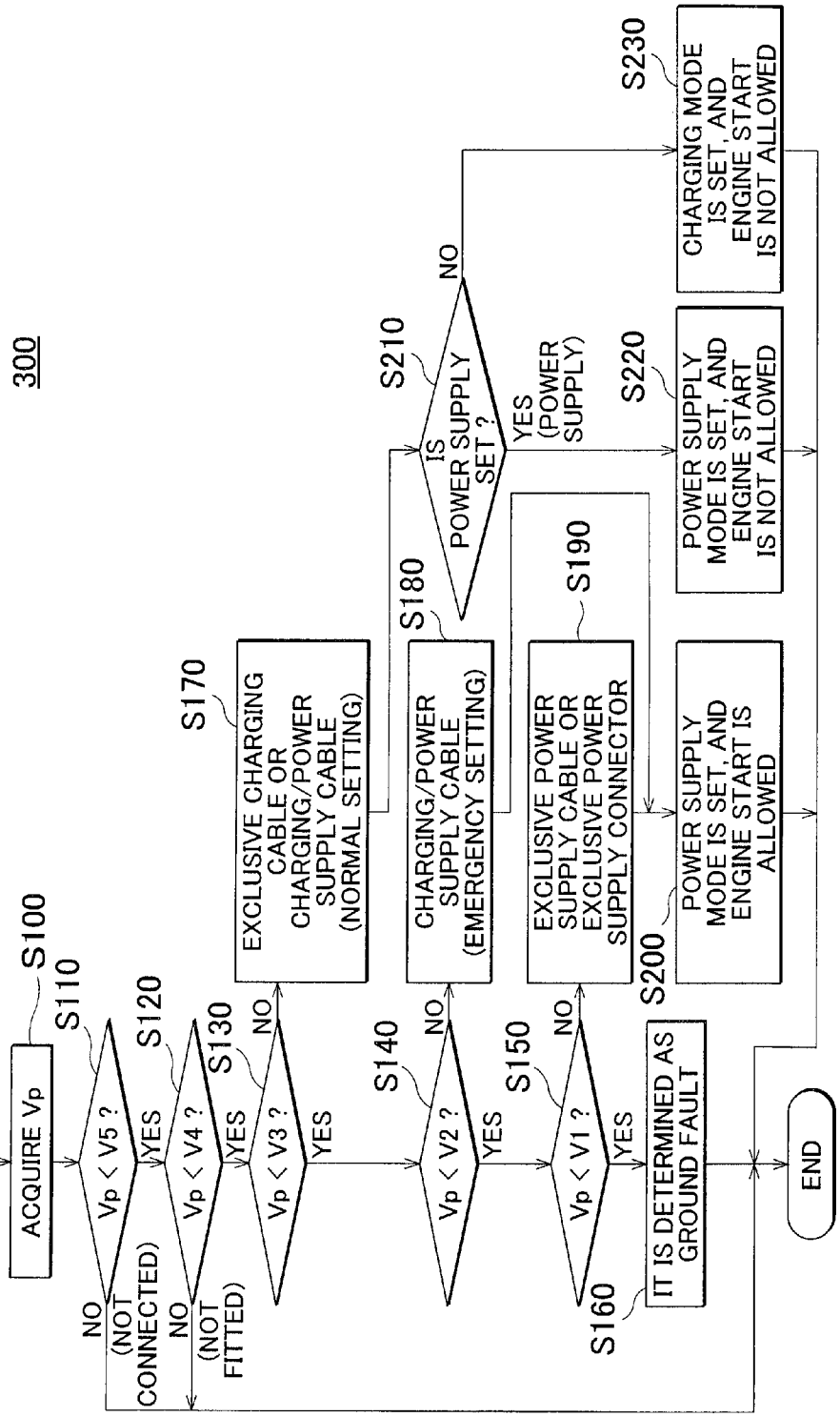

POWER SUPPLY CONNECTOR, VEHICLE AND CONTROL METHOD FOR VEHICLE

CROSS REFERENCE TO RELATED APPLICATION

This is a national phase application based on the PCT International Patent Application No. PCT/IB2012/001665 filed on Aug. 29, 2012, claiming priority to Japanese application No. 2011-187332 filed Aug. 30, 2011, the entire contents of both of which are incorporated herein by reference.

BACKGROUND OF THE INVENTION

1. Field of the Invention

The invention relates to a power supply connector, a vehicle and a control method for a vehicle and, more particularly, to a technique for supplying electric power from a vehicle to an electrical device outside of the vehicle.

2. Description of Related Art

In recent years, as an environmentally friendly vehicle, a vehicle that is equipped with an electrical storage device (for example, a secondary battery, a capacitor, or the like) and that is propelled by driving force generated from electric power stored in the electrical storage device becomes a focus of attention. Such a vehicle, for example, includes an electric vehicle, a hybrid vehicle, a fuel cell electric vehicle, and the like. Then, there is suggested a technique for charging an electrical storage device mounted on these vehicles using a commercial power supply having a high power generation efficiency.

There is known a hybrid vehicle that is able to charge an in-vehicle electrical storage device from a power supply (hereinafter, also simply referred to as "external power supply") outside of the vehicle (hereinafter, also simply referred to as "external charging") as in the case of an electric vehicle. For example, there is known a so-called plug-in hybrid vehicle that is able to charge an electrical storage device from a power supply of an ordinary household by connecting a wall outlet installed in a house to a charging inlet provided on a vehicle via a charging cable. By so doing, it may be expected to improve the fuel consumption efficiency of the hybrid vehicle.

In such an externally chargeable vehicle, the concept that a vehicle is regarded as a power supply source and electric power is supplied from the vehicle to a general electrical device outside of the vehicle as in the case of a smart grid, or the like, has been studied. In addition, a vehicle may be used as a power supply in the case where an electrical device is used in camping, outdoor work, or the like.

Japanese Patent Application Publication No. 2010-035277 (JP 2010-035277 A) describes a charge/discharge system for a vehicle that is able to charge a battery mounted on the vehicle using a charging cable. The charge/discharge system is able to supply electric power from the vehicle to an electrical load using a power cable exclusive for power supply, which is different from a charging cable, and to which a power supply plug of the electrical load outside of the vehicle is connectable.

In the system described in JP 2010-035277 A, determination as to whether it is a charging mode or a power supply mode is made on the basis of a pilot signal from the power cable. Then, in the case of the power supply mode, basically, electric power stored in an electrical storage device mounted on the vehicle is supplied to an external electrical device.

As described above, it has been studied to supply electric power from the electrical storage device mounted on the vehicle; however, a period of time during which electric power is allowed to be supplied is limited only with the electric power stored in the electrical storage device.

In a hybrid vehicle on which an electrical storage device and an engine are mounted, a rotating electrical machine is driven by the engine to make it possible to generate electric power. Therefore, it may be expected to supply electric power for a long period of time by driving the engine in addition to electric power stored in the electrical storage device.

However, in the system described in JP 2010-035277 A, it has not been studied to supply electric power generated by driving the engine in a power supply mode in a hybrid vehicle.

SUMMARY OF THE INVENTION

The invention provides electric power to a device outside of a hybrid vehicle while electric power is being generated by driving an engine in the hybrid vehicle.

A first aspect of the invention provides a power supply connector that is used at the time when electric power from a vehicle is supplied to a device outside of the vehicle via a connecting portion provided on the vehicle. The vehicle includes: an engine; a rotating electrical machine that is driven by the engine to generate electric power; and a controller that is used to control a power supply operation to the device outside of the vehicle. The power supply connector includes: a power transfer unit that transfers electric power from the vehicle; and a signal output unit that outputs a signal to the controller when the power supply connector is connected to the connecting portion. The signal causes the vehicle to perform the power supply operation while allowing operation of the engine.

The vehicle may further include an electrical storage device. The controller may supply the device outside of the vehicle, with at least one of electric power from the electrical storage device and the electric power generated by the rotating electrical machine.

When the vehicle is caused to perform the power supply operation using only electric power from the electrical storage device, the signal output unit may output a signal for prohibiting the operation of the engine to the controller.

The vehicle may be able to charge the electrical storage device with electric power outside of the vehicle via a charging cable connected to the connecting portion. The controller may recognize that a charging connector of the charging cable is connected when the charging connector is connected to the connecting portion and a first resistor provided in the charging connector is coupled to a signal path. The signal path may receive a signal indicating that the charging connector is connected. The signal output unit may include a second resistor having a resistance value different from a resistance value of the first resistor. When the power supply connector is connected to the connecting portion, the second resistor may be coupled to the signal path. The controller may switch between the power supply operation and a charging operation based on a potential of the signal path.

The controller may further determine whether to allow the operation of the engine based on the potential of the signal path.

The vehicle may be able to charge the electrical storage device with electric power outside of the vehicle via a charging cable connected to the connecting portion. The controller may perform a charging operation on the basis of a pilot signal output from the charging cable. The signal output unit may output a signal for performing the power supply operation to the controller via a signal path through which the pilot signal is transmitted.

The signal output unit may further output a signal, indicating whether to allow the operation of the engine, to the controller via the signal path through which the pilot signal is transmitted.

The signal output unit may use power line communication to output a signal for performing the power supply operation to the controller.

The power supply connector may further include an output portion that allows a power supply plug of an external electrical device to be connected and that transfers electric power, supplied from the vehicle, to the electrical device.

The vehicle may further include an electrical storage device. The vehicle may be able to charge the electrical storage device with electric power outside of the vehicle via a charging cable having a charging connector connected to the connecting portion. The power supply connector may also be used as the charging connector. The power supply connector may further include an operating portion, operated by a user, in order to switch between the power supply operation and a charging operation in the vehicle. The signal output unit may output any one of a signal for performing the power supply operation and a signal for performing the charging operation to the controller based on a state of the operating portion.

The power supply connector may be connected to one end of a cable and transfers electric power, supplied from the vehicle, to an external electrical device via the cable.

The signal output unit may be supplied with a power supply voltage from the vehicle. The power supply voltage may be supplied via a signal path through which the controller receives a signal for detecting whether the power supply connector is connected.

A second aspect of the invention provides a vehicle that is able to supply electric power to an external device. The vehicle includes: a connecting portion that connects a power supply connector transferring electric power to the external device; an engine; a rotating electrical machine that is driven by the engine to generate electric power; and a controller that is used to control a power supply operation to the external device. When a signal from the power supply connector allows the power supply operation with operation of the engine, the controller supplies the electric power, generated by the rotating electrical machine, to the external device via the connecting portion.

The vehicle may further include an electrical storage device. The controller may supply the external device with at least one of electric power from the electrical storage device and the electric power generated by the rotating electrical machine.

The vehicle may further include a power conversion device that converts alternating-current power, generated by the rotating electrical machine, to direct-current power.

The controller may determine whether the operation of the engine is required based on a state of the vehicle, and, when the operation of the engine is required, the controller may supply the electric power, generated by the rotating electrical machine, to the external device via the connecting portion.

The vehicle may further include an operating member that is operated by a user and that sets a shift range. When the shift range is set at a predetermined range, the controller may allow the power supply operation with the operation of the engine, and, when the shift range is set at a range other than the predetermined range, the controller may prohibit the power supply operation with the operation of the engine.

The predetermined range may include a parking range.

A third aspect of the invention provides a control method for a vehicle, which is used to supply electric power from the vehicle to a device outside of the vehicle via a power supply connector connected to a connecting portion provided on the vehicle. The vehicle includes an engine and a rotating electrical machine that is driven by the engine to generate electric power. The control method includes: when the power supply connector is connected to the connecting portion, receiving a signal output from the power supply connector; generating electric power with the use of the rotating electrical machine driven by the engine based on the signal; and supplying the electric power generated by the rotating electrical machine to the device outside of the vehicle via the power supply connector.

According to the aspects of the invention, it is possible to provide electric power to a device outside of a hybrid vehicle while electric power is being generated by driving an engine in the hybrid vehicle.

BRIEF DESCRIPTION OF THE DRAWINGS

Features, advantages, and technical and industrial, significance of exemplary embodiments of the invention will be described below with reference to the accompanying drawings, in which like numerals denote like elements, and wherein:

FIG. 9 is a view for illustrating an example of a method of determining the type of a cable and the type of a connector and a method of determining whether a power supply operation is allowed while an engine is being driven in an ECU;

FIG. 10 is a flow chart for illustrating the details of charging/power supply operation determination control process executed by the ECU according to the present embodiment;

DETAILED DESCRIPTION OF EMBODIMENTS

Figure 1:
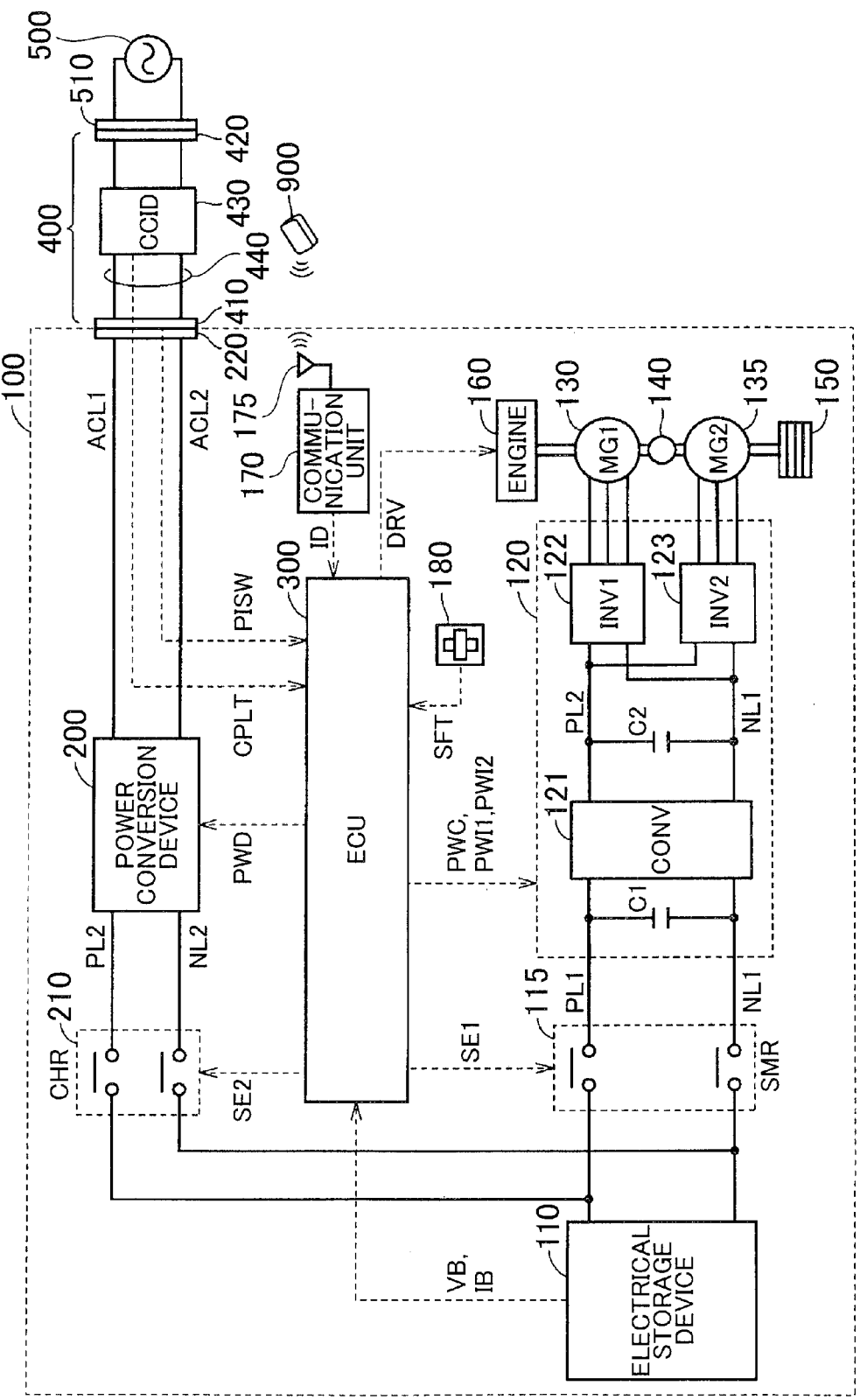
FIG. 1 is an overall block diagram of a hybrid vehicle according to an embodiment.

Hereinafter, an embodiment of the invention will be described in detail with reference to the accompanying drawings. Note that like reference numerals denote the same or corresponding components and the description thereof is not repeated.

Description of Charging System

FIG. 1 is an overall block diagram of a hybrid vehicle 100 according to the embodiment. As shown in FIG. 1, the vehicle 100 includes an electrical storage device 110, a system main relay (SMR) 115, a power control unit (PCU) 120 that serves as a driving device, motor generators 130 and 135, a power transmission gear 140, drive wheels 150, an engine 160 that serves as an internal combustion engine, a communication unit 170 and an electronic control unit (ECU) 300 that serves as a controller. The PCU 120 includes a converter 121, inverters 122 and 123, and capacitors C1 and C2.

The electrical storage device 110 is an electric power storage element that is configured to be chargeable and dischargeable. The electrical storage device 110 is, for example, formed of a secondary battery, such as a lithium ion battery, a nickel-metal hydride battery and a lead-acid battery, or an electrical storage element, such as an electric double layer capacitor.

The electrical storage device 110 is connected to the PCU 120 via a power line PL1 and a ground line NL1. Then, the electrical storage device 110 supplies the PCU 120 with electric power for generating driving force of the vehicle 100. In addition, the electrical storage device 110 stores electric power generated by the motor generators 130 and 135. The output of the electrical storage device 110 is, for example, about 200 V.

The electrical storage device 110 includes a voltage sensor and a current sensor (both are not shown), and outputs the voltage VB and current IB of the electrical storage device 110, detected by these sensors, to the ECU 300.

One of the relays of the SMR 115 is connected to the positive electrode terminal of the electrical storage device 110 and the power line PL1 connected to the PCU 120. The other one of the relays of the SMR 115 is connected to the negative electrode terminal of the electrical storage device 110 and the ground line NL1. Then, the SMR 115 switches between supply and interruption of electric power between the electrical storage device 110 and the PCU 120 on the basis of a control signal SE1 from the ECU 300.

The converter 121 carries out voltage conversion between the power line PL1 and ground line NL1 and the power line PL2 and ground line NL1 on the basis of a control signal PWC from the ECU 300.

The inverters 122 and 123 are connected to the power line PL2 and the ground line NL1 in parallel with each other. The inverter 122 converts direct-current power supplied from the converter 121 to alternating-current power to drive the motor generator 130 on the basis of a control signal PWI1 from the ECU 300. The inverter 123 converts direct-current power supplied from the converter 121 to alternating-current power to drive the motor generator 135 on the basis of a control signal PWI2 from the ECU 300.

The capacitor C1 is provided between the power line PL1 and the ground line NL1 to reduce fluctuations in voltage between the power line PL1 and the ground line NL1. In addition, the capacitor C2 is provided between the power line PL2 and the ground line NL1 to reduce fluctuations in voltage between the power line PL2 and the ground line NL1.

Each of the motor generators 130 and 135 is an alternating-current rotating electrical machine, and is, for example, a permanent magnet-type synchronous motor that includes a rotor in which a permanent magnet is embedded.

The output torque of each of the motor generators 130 is transmitted to the drive wheels 150 via the power transmission gear 140 to propel the vehicle 100. The power transmission gear 140 is formed of a speed reduction gear and a power split mechanism. Each of the motor generators 130 and 135 is able to generate electric power using the rotational force of the drive wheels 150 during regenerative braking operation of the vehicle 100. Then, the generated electric power is converted by the PCU 120 to charging electric power to charge the electrical storage device 110.

In addition, the motor generators 130 and 135 are coupled to the engine 160 via the power transmission gear 140. Then, the ECU 300 coordinately operates the motor generators 130 and 135 and the engine 160 to generate required vehicle driving force. Furthermore, each of the motor generators 130 and 135 is able to generate electric power using the rotation of the engine 160, and is able to charge the electrical storage device 110 with the generated electric power. Note that, in the present embodiment, the motor generator 135 is exclusively used as an electric motor for driving the drive wheels 150, and the motor generator 130 is exclusively used as a generator that is driven by the engine 160.

Note that FIG. 1 shows an example of a configuration that includes two motor generators; however, the number of the motor generators is not limited to two, and it may be a configuration that includes one motor generator or two or more motor generators.

The communication unit 170 is used in a so-called smart key system or a keyless entry system, and wirelessly receives an identification signal ID output from an oscillating device 900 carried by a user via an antenna 175. The received identification signal ID is output to the ECU 300, and it is determined by the ECU 300 whether the user is allowed to operate the vehicle.

The vehicle 100 includes a power conversion device 200, a charging relay (CHR) 210 and an inlet 220 that serves as a connecting portion as a configuration for charging the electrical storage device 110 with electric power from an external power supply 500.

A charging connector 410 of a charging cable 400 is connected to the inlet 220. Then, electric power from the external power supply 500 is transferred to the vehicle 100 via the charging cable 400.

The charging cable 400 includes a plug 420 and a power line 440 in addition to the charging connector 410. The plug 420 is used to connect the charging cable 400 to the wall outlet 510 of the external power supply 500. The power line 440 connects the charging connector 410 to the plug 420. A charging circuit interrupt device (hereinafter, also referred to as CCID) 430 is inserted in the power line 440 in order to switch between supply and interruption of electric power from the external power supply 500.

The power conversion device 200 is connected to the inlet 220 via power lines ACL1 and ACL2. In addition, the power conversion device 200 is connected to the electrical storage device 110 by the power line PL2 and the ground line NL2 via the CHR 210.

The power conversion device 200 is controlled by a control signal PWD from the ECU 300, and converts alternating-current power supplied from the inlet 220 to charging electric power to charge the electrical storage device 110. In addition, as will be described later, the power conversion device 200 is able to convert direct-current power from the electrical storage device 110 or direct-current power, generated by the motor generator 130 or 135 and converted by the PCU 120, to alternating-current power and then supply the alternating-current power to a device outside of the vehicle. The power conversion device 200 may be a device that is able to carry out bidirectional power conversion between charging and power supply or may include a charging device and a power supply device as separate devices.

The CHR 210 is controlled by a control signal SE2 from the ECU 300, and switches between supply and interruption of electric power transferred between the power conversion device 200 and the electrical storage device 110.

The ECU 300 includes a central processing unit (CPU), a storage device and an input/output buffer (which are not shown in FIG. 1). The ECU 300 inputs signals from sensors, or the like, and outputs control signals to various devices, and controls the electrical storage device 110 and various devices of the vehicle 100. Note that these controls are not limited to software processing but they may be processed by exclusive hardware (electronic circuit).

The ECU 300 computes the state of charge (SOC) of the electrical storage device 110 on the basis of the detected voltage VB and current IB from the electrical storage device 110.

The ECU 300 receives a signal PISW (proximity detection), indicating a connected state of the charging cable 400, from the charging connector 410. In addition, the ECU 300 receives a pilot signal CPLT (Control pilot line transmission) from the CCID 430 of the charging cable 400. As will be described with reference to FIG. 2, the ECU 300 executes a charging operation on the basis of these signals.

The ECU 300 receives a signal SFT indicating a shift range from a shift lever 180 that serves as an operating member. In addition, the ECU 300 controls the engine 160 by a control signal DRV. Note that the operating member is not limited to the shift lever and, as long as the operating member is used to change the shift range, the operating member may be, for example, a push button, or the like.

Note that, in FIG. 1, the ECU 300 is formed of one controller; instead, for example, the ECU 300 may be formed of controllers that are provided separately for functions or controlled devices, such as a controller for the PCU 120 and a controller for the electrical storage device 110.

Figure 2:
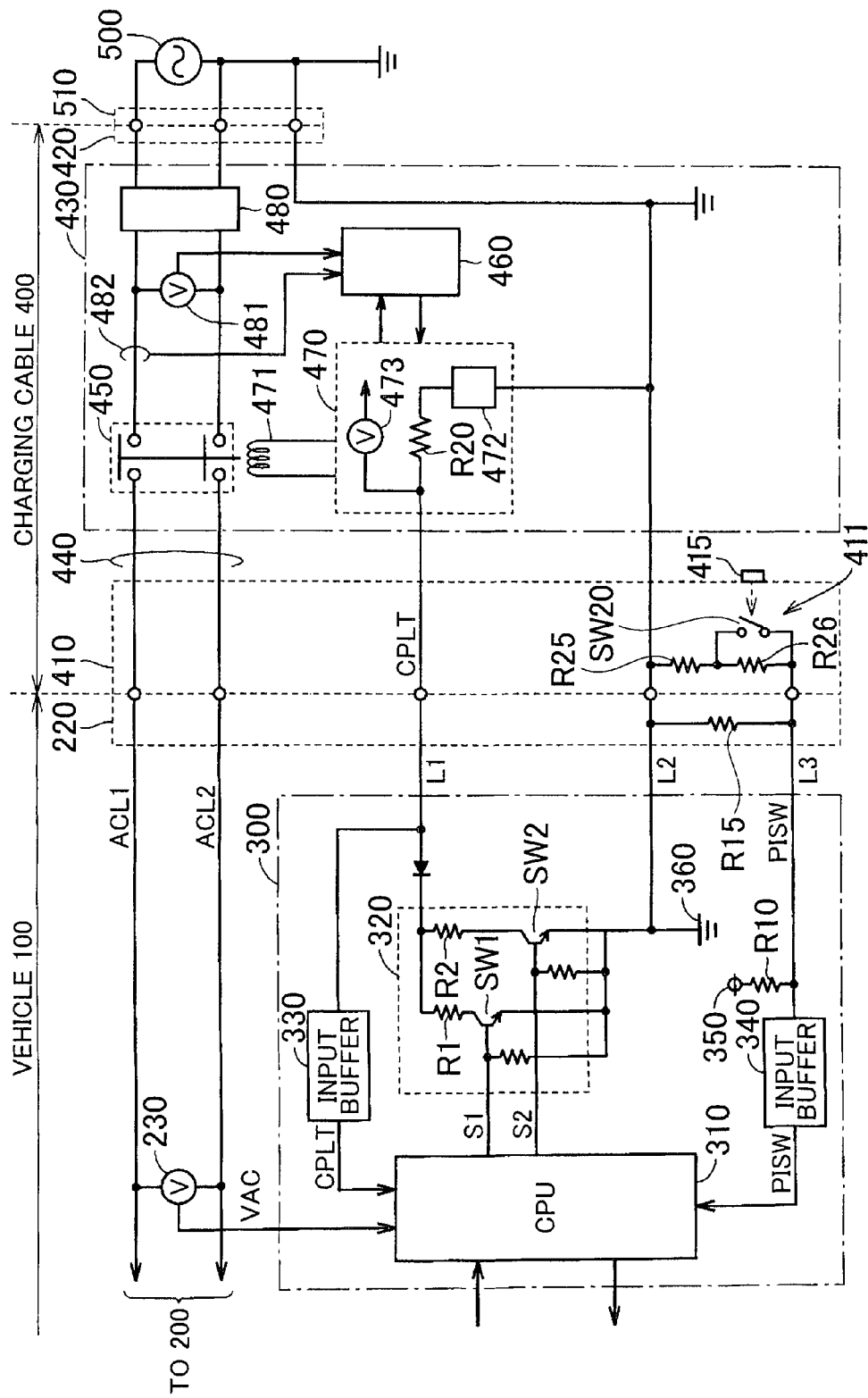
FIG. 2 is a block diagram for illustrating a charging operation in FIG. 1.

FIG. 2 is a block diagram for illustrating a charging operation in FIG. 1. Note that, in FIG. 2, the description of overlap components assigned with like reference signs to those of FIG. 1 is not repeated.

As shown in FIG. 2, the CCID 430 includes a CCID relay 450, a CCID control unit 460, a control pilot circuit 470, an electromagnetic coil 471, a ground fault detector 480, a voltage sensor 481 and a current sensor 482. In addition, the control pilot circuit 470 includes an oscillating device 472, a resistor R20 and a voltage sensor 473. [0059] The CCID relay 450 is inserted in the power line 440 within the charging cable 400. The CCID relay 450 is controlled by the control pilot circuit 470. Then, when the CCID relay 450 is open, an electric path is interrupted in the charging cable 400. On the other hand, when the CCID relay 450 is closed, electric power is supplied from the external power supply 500 to the vehicle 100.

The control pilot circuit 470 outputs the pilot signal CPLT to the ECU 300 via the charging connector 410 and the inlet 220. The pilot signal CPLT is a signal for providing information about the rated current of the charging cable 400 from the control pilot circuit 470 to the ECU 300. In addition, the pilot signal CPLT is also used as a signal for remotely operating the CCID relay 450 from the ECU 300 on the basis of the potential of the pilot signal CPLT, operated by the ECU 300. Then, the control pilot circuit 470 controls the CCID relay 450 on the basis of a variation in the potential of the pilot signal CPLT.

The above described pilot signal CPLT and connection signal PISW and configurations, such as the shapes, terminal arrangements, and the like, of the inlet 220 and charging connector 410 are, for example, standardized by Society of Automotive Engineers (SAE) of the United States of America, Japan Electric Vehicle Association, and the like.

The CCID control unit 460 includes a CPU, a storage device and an input/output buffer (which are not shown in the drawing). The CCID control unit 460 inputs and outputs signals of sensors and the control pilot circuit 470, and controls the charging operation of the charging cable 400.

The oscillating circuit 472 outputs a non-oscillating signal when the potential of the pilot signal CPLT, detected by the voltage sensor 473, is a prescribed potential (for example, 12 V). When the potential of the pilot signal CPLT is lower than the above prescribed potential (for example, 9 V), the oscillating circuit 472 is controlled by the CCID control unit 460 to output a signal that oscillates at a prescribed frequency (for example, 1 kHz) and duty cycle.

Note that the potential of the pilot signal CPLT is operated by the ECU 300. In addition, the duty cycle is set on the basis of the rated current that is allowed to be supplied from the external power supply 500 to the vehicle 100 via the charging cable 400.

When the potential of the pilot signal CPLT is lower than the prescribed potential as described above, the pilot signal CPLT oscillates at a prescribed period. Here, the pulse width of the pilot signal CPLT is set on the basis of the rated current that is allowed to be supplied from the external power supply 500 to the vehicle 100 via the charging cable 400. That is, information about the rated current is provided from the control pilot circuit 470 to the ECU 300 of the vehicle 100 using the pilot signal CPLT at a duty ratio that is indicated by the ratio of the pulse width to the oscillating period.

Note that the rated current is set for each charging cable, and the rated current varies among the different types of the charging cable 400. Thus, the duty ratio of the pilot signal CPLT also varies among the charging cables 400.

The ECU 300 is able to detect the rated current that is allowed to be supplied to the vehicle 100 via the charging cable 400 on the basis of the duty ratio of the pilot signal CPLT received via a control pilot line L1.

When the potential of the pilot signal CPLT is further decreased by the ECU 300 (for example, 6 V), the control pilot circuit 470 supplies current to the electromagnetic coil 471. When the electromagnetic coil 471 is supplied with current from the control pilot circuit 470, the electromagnetic coil 471 generates electromagnetic force to close the contacts of the CCID relay 450 to place the CCID relay 450 in a conductive state.

The ground fault detector 480 is provided in the middle of the power line 440 of the charging cable 400 inside the CCID 430, and detects whether there is a ground fault. Specifically, the ground fault detector 480 detects a balanced state between currents flowing through the pair of power lines 440 in mutually opposite directions, and detects a ground fault when the balanced state collapses. Although not shown in the drawing, when a ground fault has been detected by the ground fault detector 480, electric power supplied to the electromagnetic coil 471 is interrupted. Thus, the contacts of the CCID relay 450 are opened to place the CCID relay 450 in a non-conductive state.

When the plug 420 of the charging cable 400 is plugged into the wall outlet 510, the voltage sensor 481 detects a power supply voltage transferred from the external power supply 500, and provides information about the detected power supply voltage to the CCID control unit 460. In addition, the current sensor 482 detects a charging current flowing through the power line 440, and provides information about the detected charging current to the CCID control unit 460.

A connection detection circuit 411 is included in the charging connector 410. The connection detection circuit 411 includes resistors R25 and R26 and a switch SW20. The resistors R25 and R26 are connected in series with each other between a connection signal line L3 and a ground line L2. The switch SW20 is connected in parallel with the resistor R26.

The switch SW20 is, for example, a limit switch. The contact of the switch SW20 is closed in a state where the charging connector 410 is certainly fitted to the inlet 220. In a state where the charging connector 410 is separated from the inlet 220 or when the fitted state of the charging connector 410 and the inlet 220 is uncertain, the contact of the switch SW20 is opened. In addition, the contact of the switch SW20 is also opened by operating an operating portion 415. The operating portion 415 is provided on the charging connector 410, and is operated by the user at the time when the charging connector 410 is removed from the inlet 220.

In a state where the charging connector 410 is separated from the inlet 220, a voltage signal that is determined by the voltage of a power supply node 350 and a pull-up resistor R10, included in the ECU 300, and a resistor R15 provided in the inlet 220 occurs in the connection signal line L3 as the connection signal PISW. In addition, in a state where the charging connector 410 is connected to the inlet 220, a voltage signal corresponding to a combined resistor of a combination of the resistors R15, R25 and R26 occurs in the connection signal line L3 in correspondence with the fitted state, the operating state of the operating portion 415, and the like.

The ECU 300 detects the potential of the connection signal line L3 (that is, the potential of the connection signal PISW) to make it possible to determine the connection state and fitted state of the charging connector 410.

In the vehicle 100, the ECU 300 further includes a CPU 310, a resistance circuit 320 and input buffers 330 and 340 in addition to the above described power supply node 350 and pull-up resistor R10.

The resistance circuit 320 includes pull-down resistors R1 and R2 and switches SW1 and SW2. The pull-down resistor R1 and the switch SW1 are connected in series with each other between a vehicle ground 360 and the control pilot line L1 through which the pilot signal CPLT is transmitted. The pull-down resistor R2 and the switch SW2 are also connected in series with each other between the vehicle ground 360 and the control pilot line L1. Then, the switches SW1 and SW2 each are controlled to be conductive or non-conductive in accordance with respective control signals S1 and S2 from the CPU 310.

The resistance circuit 320 is a circuit for operating the potential of the pilot signal CPLT from the side of the vehicle 100.

The input, buffer 330 receives the pilot signal CPLT of the control pilot line L1, and outputs the received pilot signal CPLT to the CPU 310. The input buffer 340 receives the connection signal PISW from the connection signal line L3 connected to the connection detection circuit 411 of the charging connector 410, and outputs the received connection signal PISW to the CPU 310. Note that a voltage is applied to the connection signal line L3 from the ECU 300 as described above, and the potential of the connection signal PISW varies as the charging connector 410 is connected to the inlet 220. The CPU 310 detects the potential of the connection signal PISW to detect the connection state and fitted state of the charging connector 410.

The CPU 310 receives the pilot signal CPLT and the connection signal PISW respectively from the input buffers 330 and 340. The CPU 310 detects the potential of the connection signal PISW, and detects the connection state and fitted state of the charging connector 410. In addition, the CPU 310 detects the oscillating state and duty cycle of the pilot signal CPLT to detect the rated current of the charging cable 400.

Then, the CPU 310 controls the control signals S1 and S2 of the switches SW1 and SW2 on the basis of the potential of the connection signal PISW and the oscillating state of the pilot signal CPLT to operate the potential of the pilot signal CPLT. By so doing, the CPU 310 is able to remotely operate the CCID relay 450. Then, electric power is transferred from the external power supply 500 to the vehicle 100 via the charging cable 400.

The CPU 310 receives a voltage VAC supplied from the external power supply 500. The voltage VAC is detected by the voltage sensor 230 provided between the power lines ACL1 and ACL2.

As shown in FIG. 1 and FIG. 2, when the contacts of the CCID relay 450 are closed, alternating-current power from the external power supply 500 is applied to the power conversion device 200, and a preparation for charging the electrical storage device 110 from the external power supply 500 is completed. The CPU 310 outputs the control signal PWD to the power conversion device 200 to convert alternating-current power from the external power supply 500 to direct-current power with which the electrical storage device 110 is allowed to be charged. Then, the CPU 310 outputs the control signal SE2 to close the contacts of the CHR 210 to thereby charge the electrical storage device 110.

First Embodiment

In the above described externally chargeable vehicle, the concept that a vehicle is regarded as a power supply source and electric power is supplied from the vehicle to a general electrical device outside of the vehicle as in the case of a smart grid, or the like, has been studied. In addition, the vehicle may be used as a power supply in the case where an electrical device is used in camping, outdoor work, or the like.

For example, when a disaster, such as an earthquake, occurs and electricity that is a lifeline is stopped, the above configured vehicle is expected to be used as a power supply. However, when electric power from the vehicle is supplied, generally it is mostly assumed that electric power stored in the electrical storage device is supplied, and a period of time during which electric power is allowed to be supplied is limited.

Therefore, as in the case of the vehicle 100 shown in FIG. 1, the hybrid vehicle equipped with the electrical storage device 110 and the engine 160 is able to generate electric power by driving the engine 160. Therefore, the electric power generated by driving the engine 160 is used in addition to electric power stored in the electrical storage device 110. By so doing, it is possible to supply electric power for a long period of time.

Then, in the first embodiment, a power supply connector that is connectable to the inlet to which the charging cable is connected at the time of external charging and that is able to cause the vehicle to supply electric power to a device outside of the vehicle while performing a power generation operation by driving the engine will be described.

Figure 3:
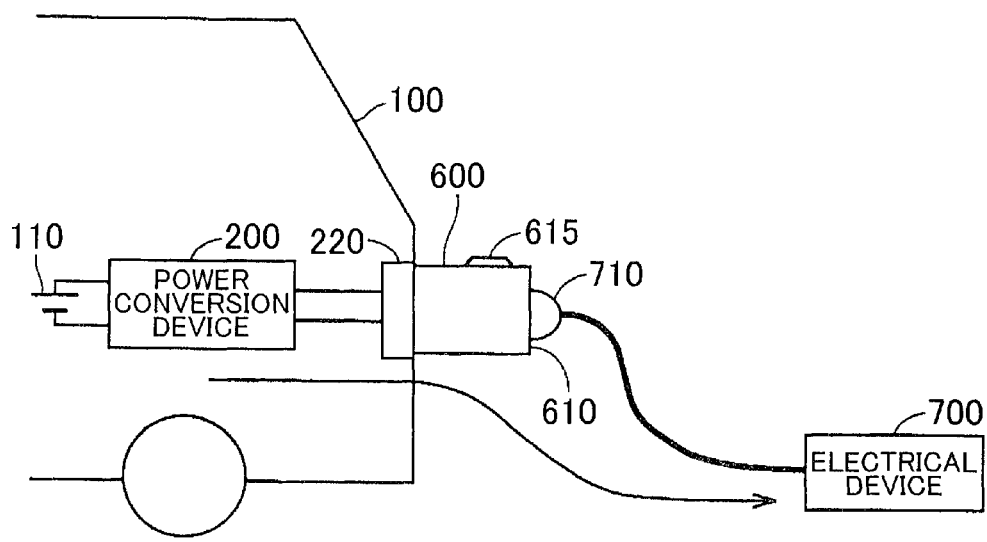
FIG. 3 is a view for illustrating the outline of a power supply operation using an exclusive power supply connector according to the first embodiment.

FIG. 3 is a view for illustrating the outline of a power supply operation using an exclusive power supply connector 600 according to the first embodiment.

As shown in FIG. 3, the power supply connector 600 includes a terminal portion having a similar shape to that of the terminal portion of the charging connector 410 of the charging cable 400 described with reference to FIG. 1, and is connectable to the inlet 220 of the vehicle 100.

Figure 4:
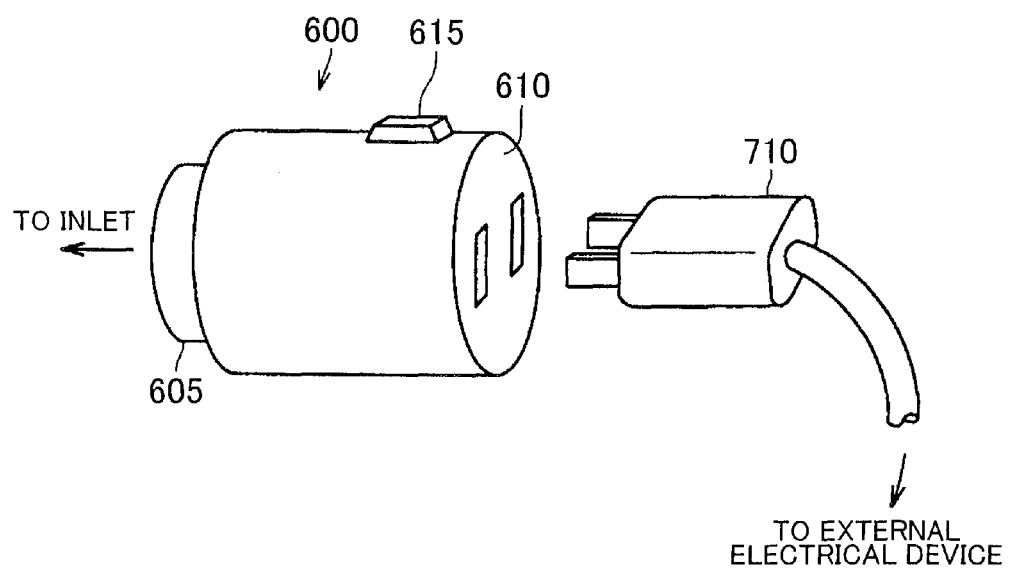
FIG. 4 is a schematic view of the power supply connector.

As shown in the schematic view of FIG. 4, the power supply connector 600 has a fitting portion 605 and an operating portion 615. The fitting portion 605 has a shape corresponding to the inlet 220 so as to be fittable to the inlet 220. In addition, by pressing down the operating portion 615, the fitted state of the inlet 220 is released.

The power supply connector 600 has an output portion 610 that allows a power supply plug 710 of an external electrical device 700 to be connected.

When the power supply connector 600 is connected to the inlet 220, a power supply operation is performed in the vehicle 100 through a method described later with reference to FIG. 5, and the like, and electric power from the vehicle 100 is supplied to the electrical device 700 via the inlet 220 and the power supply connector 600.

Figure 5:
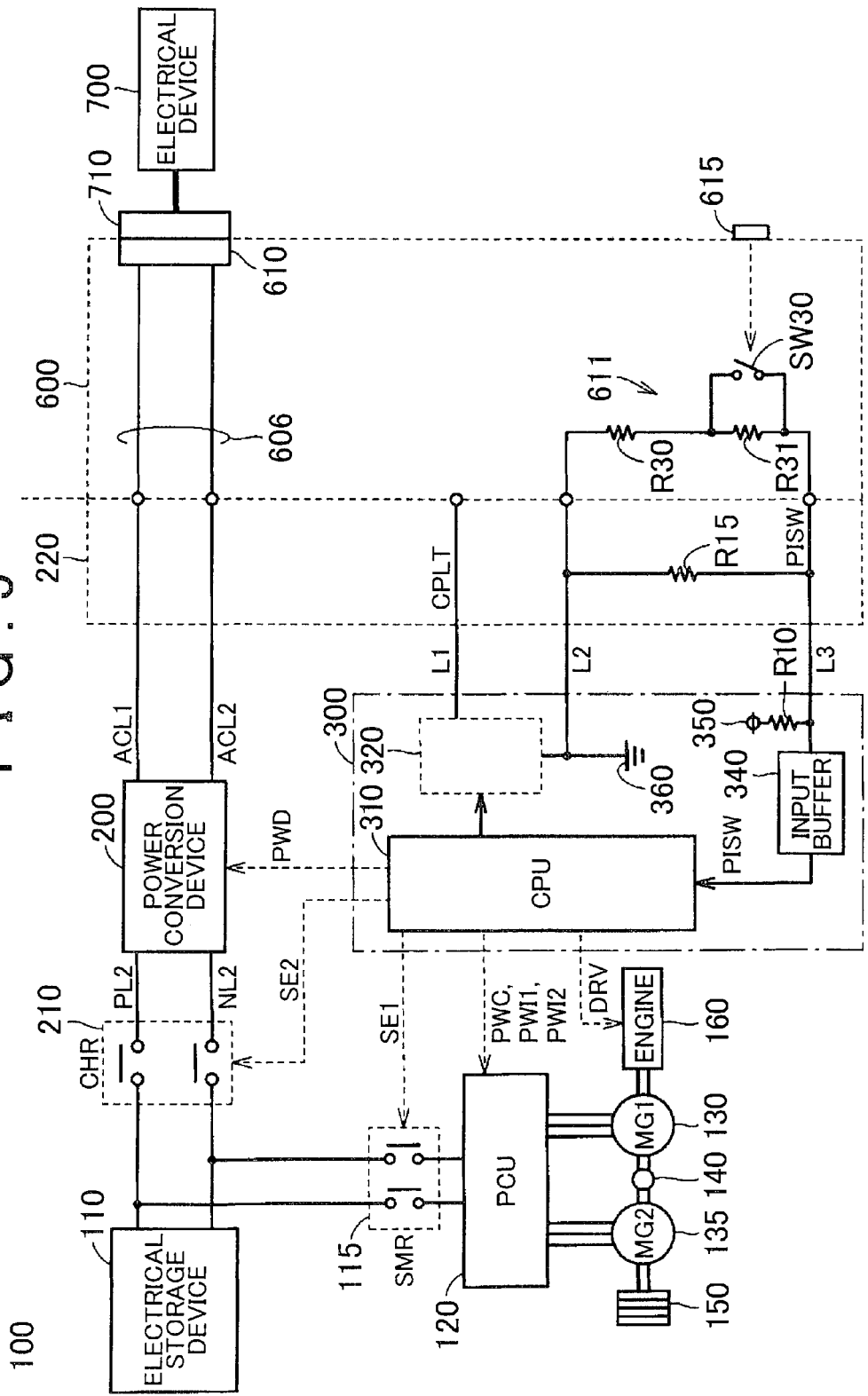
FIG. 5 is a block diagram for illustrating the power supply operation using the power supply connector shown in FIG. 4.

FIG. 5 is a block diagram for illustrating the power supply operation using the power supply connector shown in FIG. 4. Note that, in FIG. 5, the description of overlap components assigned with like reference signs to those of FIG. 1 and FIG. 2 is not repeated.

As shown in FIG. 5, when the power supply connector 600 is connected to the inlet 220, the power lines ACL1 and ACL2 of the vehicle 100 and the output portion 610 are electrically connected via a power transfer unit 606.

The power supply connector 600 further includes resistors R30 and R31 and a switch SW30 for forming a connection detection circuit 611 similar to that of the charging connector 410 shown in FIG. 2. When the power supply connector 600 is connected to the inlet 220, the resistors R30 and R31 are connected in series with each other between the connection signal line L3 and the ground line L2.

The switch SW30 is connected in parallel with the resistor R31. The contact of the switch SW30 is closed in a state where the power supply connector 600 is certainly fitted to the inlet 220. In a state where the power supply connector 600 is separated from the inlet 220 or when the fitted state of the power supply connector 600 and the inlet 220 is uncertain, the contact of the switch SW30 is opened. In addition, the contact of the switch SW30 is opened by operating the operating portion 615 as well.

When the power supply connector 600 is connected to the inlet 220, the CPU 310 is able to determine the connection state and fitted state of the power supply connector 600 on the basis of a combined resistor determined by a combination of the resistors R10, R15, R30 and R31. At this time, the resistors R30 and R31 of the power supply connector 600 have resistance values different from the resistors R25 and R26 of the charging cable 400. For example, the resistors R30 and R31 and the resistors R25 and R26 are set such that the sum of the resistance values of the resistors R30 and R31 is substantially equal to the sum of the resistance values of the resistors R25 and R26 (R30+R31≈R25+R26), the resistance value of the resistor R30 is significantly smaller than the resistance value of the resistor R25 (R30<R25) and the resistance value of the resistor R31 is larger than the resistance value of the resistor R26 (R31>R26). By so doing, the potential of the connection signal PISW in the case where the power supply connector 600 is in the fitted state is different from that in the case of the charging cable 400, so the CPU 310 is able to identify whether the connector connected to the inlet 220 is a charging connector or a power supply connector.

When the CPU 310 recognizes that the power supply connector 600 is connected on the basis of the potential of the connection signal PISW, the CPU 310 closes the CHR 210 and executes control to cause the power conversion device 200 to perform the power supply operation to thereby supply electric power from the electrical storage device 110 to the external electrical device 700.

Furthermore, when the SOC of the electrical storage device 110 is low or when there is an instruction from the user, the CPU 310 drives the engine 160 to generate electric power with the use of the motor generator 130 to thereby supply the generated electric power to the electrical device 700.

In this way, in the power supply connector, by setting the resistance values of the connection detection circuit to values different from those of the charging connector, it is possible to cause the vehicle-side ECU to recognize that the power supply connector is connected and then perform the power supply operation and to supply electric power generated by driving the engine. By so doing, it is possible to supply electric power to a device outside of the vehicle for a long period of time.

Figure 6:
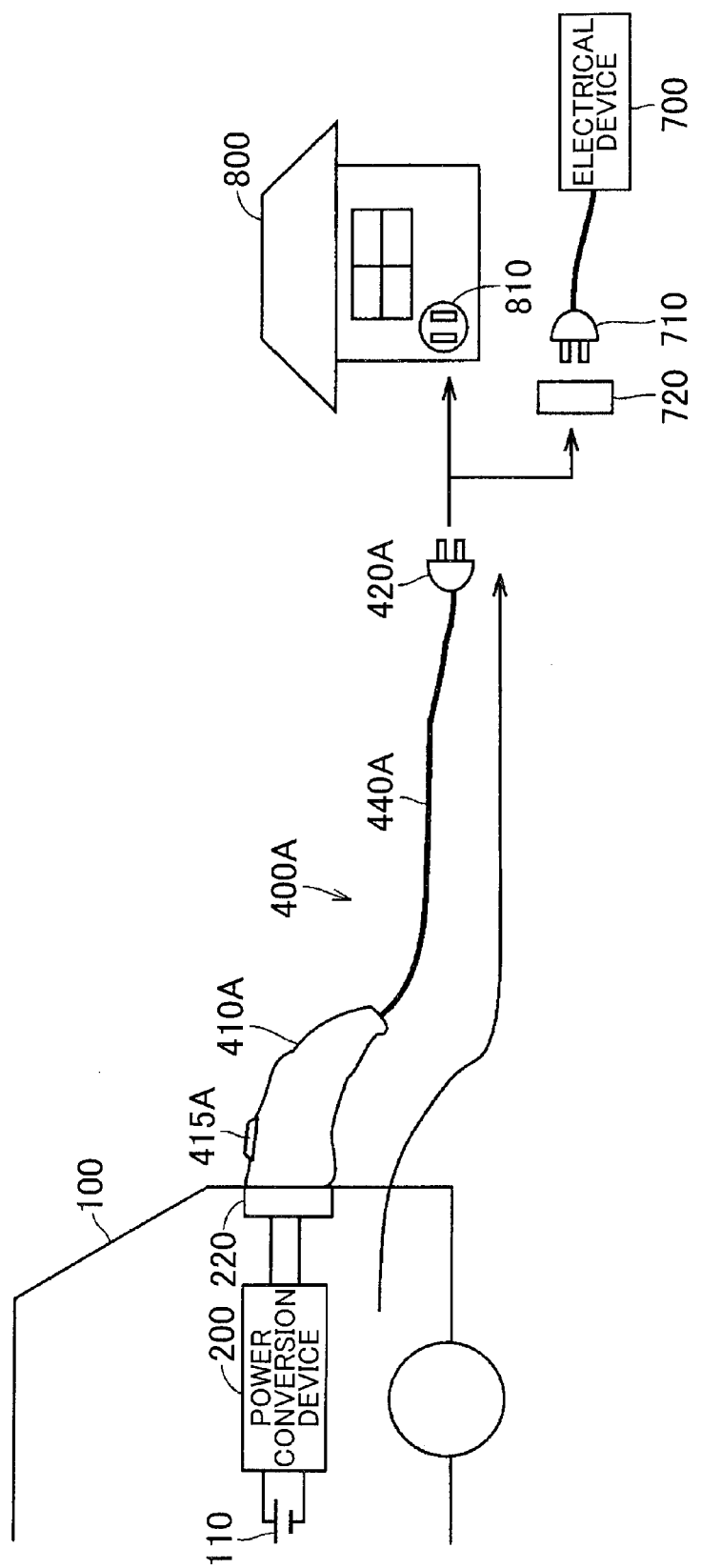
FIG. 6 is a view for illustrating the outline of a power supply operation in the case where an exclusive power supply cable is used.

Note that, in the above description, the power supply plug of the external electrical device is connected to the power supply connector; instead, as shown in FIG. 6, a power supply cable 400A may be configured to transfer electric power from the power supply connector through the cable. In this case as well, the resistance values of the connection detection circuit included in a power supply connector 410A are set as in the case of FIG. 5. By so doing, it is possible to supply electric power from the vehicle 100 and generate electric power by the engine.

In the power supply cable 400A shown in FIG. 6, a plug 420A has an external plug shape. With such a plug shape, for example, when the power of a house 800 fails, the plug 420A of the power supply cable 400A is connected to a wall outlet 810 of the house 800 to thereby make it possible to supply electric power from the vehicle 100 to an electrical device in the house 800. In addition, for the individual electrical device 700, for example, an adapter 720 that allows the plug 420A of the power supply cable 400A and a power supply plug 710 of the electrical device 700 to be connected is used. By so doing, it is possible to supply electric power to the individual electrical device 700. Note that the plug 420A may have an internal plug shape.

Second Embodiment

In the first embodiment, the power supply connector and power supply cable exclusive for power supply are used to supply electric power from the vehicle to an external device.

In a second embodiment, a cable that may be used for both charging and power supply by switching therebetween and that is able to supply electric power while generating electric power by driving the engine will be described.

Figure 7:
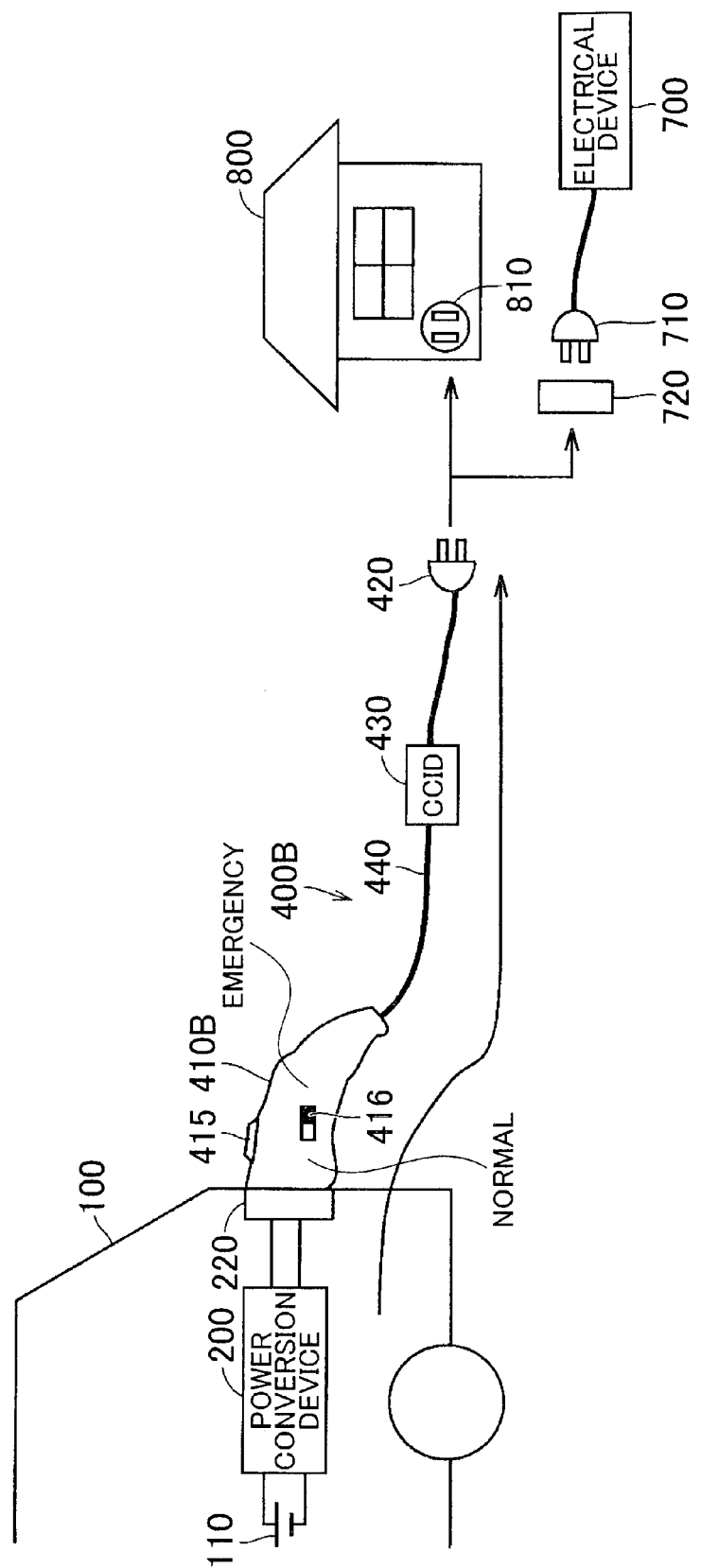
FIG. 7 is a view for illustrating the outline of a power supply operation in the case where a cable that is able to perform both charging and power supply in a second embodiment.

FIG. 7 is a view for illustrating the outline of a power supply operation in the case where a charging/power supply cable 400B that allows both charging and power supply by switching therebetween is used in the second embodiment. Note that the description of the charging operation is similar to that in FIG. 2, so it is not repeated.

As shown in FIG. 7, the charging/power supply cable 400B is formed such that the charging connector 410 in the charging cable 400 described in FIG. 2 is replaced with a charging/power supply connector 410B.

The charging/power supply connector 410B is further provided with a selector switch 416 in addition to the configuration of the charging connector 410. The selector switch 416 is a switch for selecting any one of the charging operation and the power supply operation. When the selector switch 416 is switched to "emergency", the vehicle 100 performs the power supply operation to an external device while performing the power generation operation by driving the engine.

Figure 8:
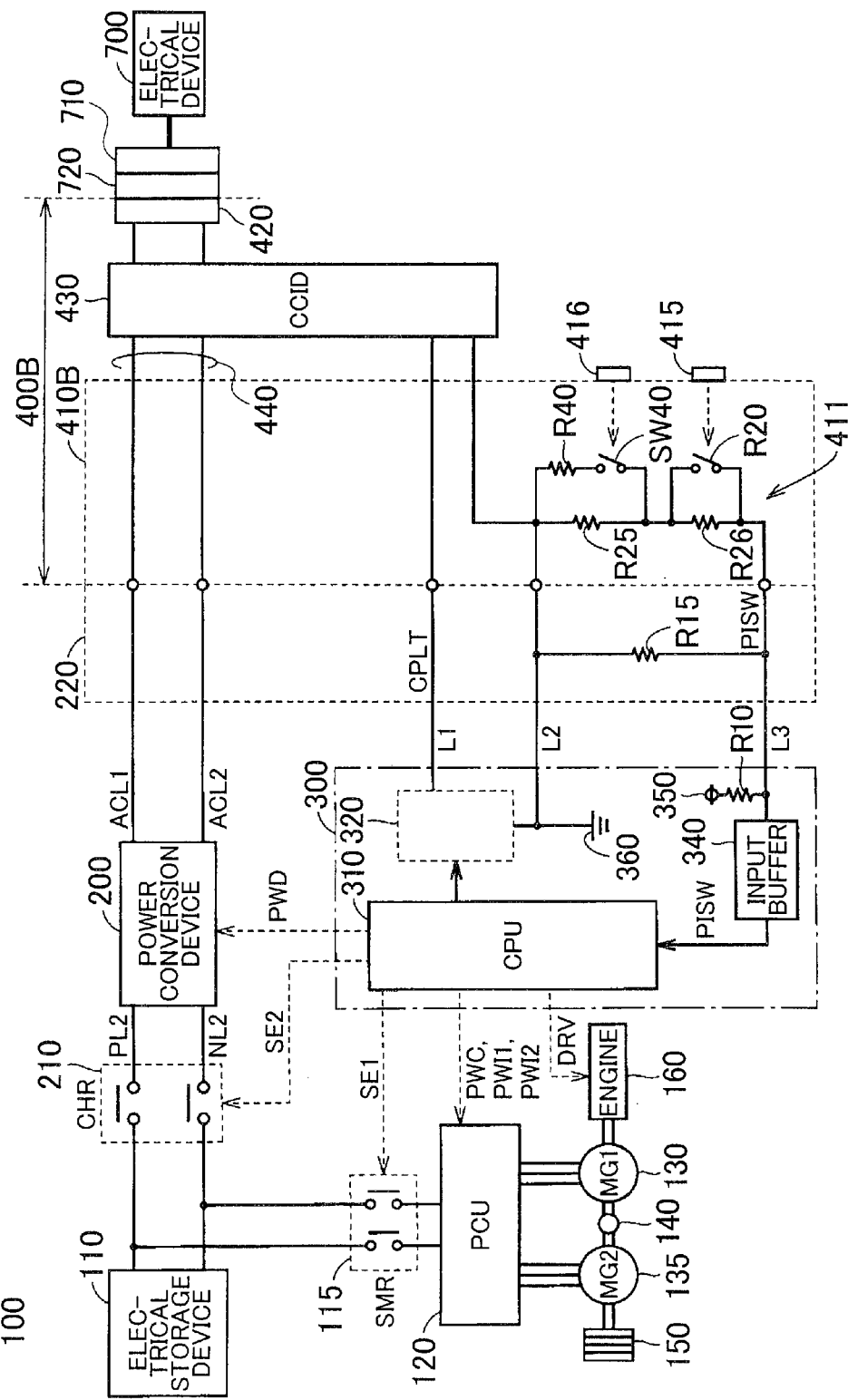
FIG. 8 is a block diagram for illustrating a charging and power supply operation in the case where the cable shown in FIG. 7 is used.

FIG. 8 is a block diagram for illustrating the charging and power supply operations in the case where the charging/power supply cable 400B shown in FIG. 7 is used in the second embodiment. In the charging/power supply cable 400B, a resistor R40 and a switch SW40 are further included in the connection detection circuit 411 in addition to the selector switch 416 in the configuration of the charging cable 400 described with reference to FIG. 2. Note that the internal configuration of the CCID 430 is similar to that of the charging cable 400 shown in FIG. 2, so the description thereof is omitted.

The serially connected resistor R40 and switch SW40 are connected in parallel with the resistor R25 of the connection detection circuit 411. The switch SW40 is synchronized with the selector switch 416. The switch SW40 is closed when the selector switch 416 is set to "emergency" and is open when the selector switch 416 is set to "normal".

With the above configuration, when the selector switch 416 is set to "normal", the connection state and fitted state of the charging/power supply connector 410B are recognized on the basis of the potential of the connection signal PISW, which varies with a combined resistor determined by a combination of the resistors R10, R15, R25 and R26 as described with reference to FIG. 2. Thus, the charging operation is performed.

On the other hand, when the selector switch 416 is set to "emergency", the switch SW40 is closed to add the resistor R40 to the combined resistor. In the fitted state of the charging/power supply connector 410B (that is, in a state where the switch SW20 is closed), the resistors R15, R25 and R40 are connected in parallel with one another between the connection signal line L3 and the ground line L2, so the potential of the connection signal line L3 (that is, the potential of the connection signal PISW) decreases in comparison with the case of the charging operation where the selector switch 416 is set to "normal". By so doing, the CPU 310 recognizes that the power supply operation is set, executes control to cause the power conversion device 200 to perform the power supply operation, and performs the power generation operation by driving the engine 160 where necessary.

Note that, in the above description, when the power supply operation is performed, the engine may be driven so that power supply is allowed for a long period of time in case of emergency; however, it may be configured such that, when the selector switch 416 is set to "normal", a power supply operation without driving the engine is performed. In this case, for example, an additional switch is provided on the connector or an operation panel, or the like, at the side of the vehicle 100 is used to set. By so doing, it is possible to switch between the charging operation and the power supply operation without driving the engine.

Charging/Power Supply Operation Determination Control in ECU

Next, charging/power supply operation determination control executed by the ECU 300 of the vehicle 100 will be described with reference to FIG. 9 and FIG. 10.

As described above, in the present embodiment, the potential of the connection signal PISW is varied to cause the ECU 300 to recognize the type of the connector connected to the inlet 220, the connection state and fitted state of the connector, switching between the charging operation and the power supply operation and whether the engine 160 is allowed to be driven.

FIG. 9 shows the potential levels Vp of the connection signal PISW for determining these states and determination criteria corresponding to those potential levels Vp.

As shown in FIG. 9, when the connector is not connected, the potential Vp of the connection signal PISW falls within a potential range ($V6 \leq Vp < V7$) that is determined by the resistance value of the resistor R15 included in the inlet 220.

In the case of a half-fitted state where the connector is connected to the inlet 220 but is not completely fitted, the serially connected resistors R25 and R25 (or the resistors R30 and R31) are connected in parallel with the resistor R15 between the ground line L2 and the connection signal line L3. By so doing, the potential Vp of the connection signal PISW falls within the range of $V4 \leq Vp < V5$.

In a state where the connector is completely fitted to the inlet 220, the switch SW20 (or the switch SW30) is closed to short-circuit both ends of the resistor R26 (or the resistor R31). By so doing, the resistors R15 and R25 (or R30) are connected in parallel with each other between the ground line L2 and the connection signal line L3, and the potential Vp of the connection signal PISW is lower than V4.

When the selector switch 416 is set to "normal" in the charging/power supply cable 400B or in the case of the charging cable 400, the resistors R15 and R25 are connected in parallel with each other between the ground line L2 and the connection signal line L3, and the potential Vp of the connection signal PISW falls within the range of $V3 \leq Vp < V4$. In this state, a start of the engine 160 is not allowed, and the charging operation is performed or, when the power supply operation is instructed in the charging/power supply cable 400B, electric power from the electrical storage device 110 is used to supply electric power to an external device in a state where the engine 160 is stopped.

When the selector switch 416 is set to "emergency" in the charging/power supply cable 400B, the switch SW40 is closed, and the resistors R15, R25 and R40 are connected in parallel with one another between the ground line L2 and the connection signal line L3. By so doing, the potential Vp of the connection signal PISW falls within the range of $V2 \leq Vp < V3$. In this state, the charging/power supply cable 400B is used to make it possible to perform the power supply operation while performing the power generation operation by driving the engine.

In the case of the exclusive power supply connector 600 and power supply cable 400A, the resistors R15 and R30 are connected in parallel with each other between the ground line L2 and the connection signal line L3. As described above, the resistance value of the resistor R30 is set so as to be smaller than that of the resistor R25, and the potential Vp of the connection signal PISW falls within the range of V1≤Vp<V2. In this state, it is determined to be the emergency power supply operation using the exclusive power supply connector 600 and power supply cable 400A, and the power supply operation is allowed while performing the power generation operation by driving the engine.

Note that, in the case of Vp≥V7, it is determined that it is highly likely that the ground line L2 or the connection signal line L3 has a break. In addition, in the case of Vp<V1, it is determined that it is highly likely to be a ground-fault state where the ground line L2 and the connection signal line L3 are short-circuited. In these cases, an abnormality is output, and neither the charging operation nor the power supply operation is performed.

The resistance values of the resistors R15, R25, R26, R30, R31 and R40 are appropriately set so as to satisfy the relationship in potential level shown in FIG. 9.

FIG. 10 is a flow chart for illustrating the details of charging/power supply operation determination control process executed by the ECU 300 in the present embodiment. The processes of the flow charts of FIG. 10 and FIG. 11 (described later) are implemented such that programs pre-stored in the CPU 310 are executed at predetermined intervals. Alternatively, the processes of part of steps may be implemented by constructing exclusive hardware (electronic circuit).

As shown in FIG. 10, the ECU 300 acquires the potential Vp of the connection signal PISW in step (hereinafter, step is abbreviated as S) 100. Then, the ECU 300 determines in step S110 whether the potential Vp is lower than V5.

When the potential Vp is higher than or equal to V5 (NO in S110), the ECU 300 determines that the connector is not connected, and skips the following processes to end the process.

When the potential Vp is lower than V5 (YES in S110), the process proceeds to S120, and the ECU 300 subsequently determines whether the potential Vp is lower than V4.

When the potential Vp is higher than or equal to V4 (NO in S120), that is, in the case of V4≤Vp<V5, the ECU 300 determines that the fitted state of the connector is uncertain, and skips the following processes to end the process.

When the potential Vp is lower than V4 (YES in S120), the process proceeds to S130, and the ECU 300 subsequently determines whether the potential Vp is lower than V3.

When the potential Vp is higher than or equal to V3 (NO in S130), that is, in the case of V3≤Vp<V4, the process proceeds to S170, the ECU 300 determines that the connected connector is the charging cable 400 or the selector switch 416 is set to "normal" in the charging/power supply cable 400B. Then, the process proceeds to S210, and the ECU 300 determines whether power supply is set.

When power supply is set (YES in S210), the process proceeds to S220, and the ECU 300 performs the power supply operation while the engine 160 is not started.

When power supply is not set, that is, when charging is set (NO in S210), the process proceeds to S230, and the ECU 300 performs the charging operation without starting the engine 160. Note that, in the case of the charging cable 400, the process of S230 is executed irrespective of whether power supply is set.

On the other hand, when the potential Vp is lower than V3 (YES in S130), the process proceeds to S140, and the ECU 300 subsequently determines whether the potential Vp is lower than V2.

When the potential Vp is higher than or equal to V2 (NO in S140), that is, in the case of V2≤Vp<V3, the process proceeds to S180, and the ECU 300 determines that the charging/power supply cable 400B is connected and the selector switch 416 is set "emergency". Then, the process proceeds to S200, and the ECU 300 performs the power supply operation, and allows the engine 160 to start and, where necessary, performs the power generation operation by driving the engine 160.

When the potential Vp is lower than V2 (YES in S140), the process proceeds to S150, and the ECU 300 subsequently determines whether the potential Vp is lower than V1.

When the potential Vp is higher than or equal to V1 (NO in S150), that is, in the case of V1≤Vp<V2, the process proceeds to S190, and the ECU 300 determines that the connected connector is any one of the exclusive power supply connector 600 and the power supply cable 400A. Then, the process proceeds to S200, and the ECU 300 performs the power supply operation, allows the engine 160 to start, and, where necessary, performs the power generation operation by driving the engine 160.

When the potential Vp is lower than V1 (YES in S150), the process proceeds to S160, and the ECU 300 determines that it, is in a ground-fault state where the ground line L2 and the connection signal line L3 are short-circuited, outputs an abnormality and then ends the process.

By executing control in accordance with the above described processes, it is possible to determine the type of the connector connected, switching between the charging operation and the power supply operation and whether a start of the engine is allowed during power supply operation on the basis of the potential of the connection signal of the connector connected to the inlet.

Note that, in the case where the power supply operation is performed while the engine is being driven, when the shift lever is erroneously set at a drive range, the vehicle may move while the power cable remains connected. This may lead to a breakage of the connector, or the like, or a failure of the device. In addition, in the case where the power supply operation is executed while the engine is being driven, the user may leave from near the vehicle. Then, the vehicle may be stolen by others.

Therefore, when the power supply operation is performed while the engine is being driven, it is desirable to set a condition that the shift lever is set at a parking range (P range). That is, when the shift lever is not set at the P range, a start of the engine is prohibited. Furthermore, when the shift lever is changed from the P range to another range in the case where the power supply operation is performed while the engine is being driven, the engine is stopped, and a restart of the engine is prohibited.

In the above described first and second embodiments, the resistance values of the connection detection circuit in the connector are varied to change the potential of the connection signal PISW to thereby determine information about the connector, switching between the charging operation and the power supply operation and whether a start of the engine is allowed. However, determination at the vehicle side may be made on the basis of information different from a variation in the potential of the connection signal PISW. In the following third and fourth embodiments, examples using an information transmission path other than the connection signal PISW will be described.

Third Embodiment

Figure 11:
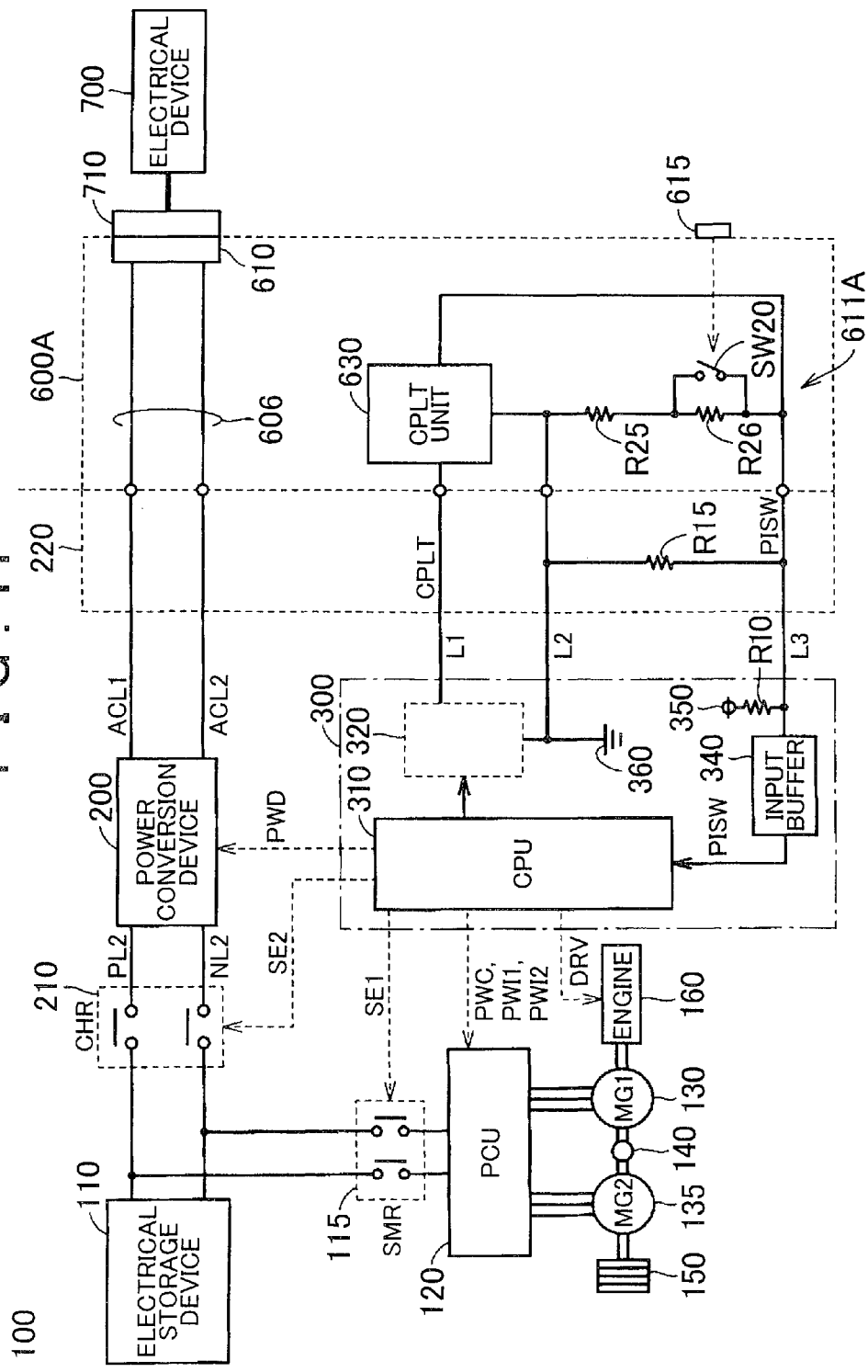
FIG. 11 is a block diagram for illustrating a power supply operation in the case where a power supply connector according to a third embodiment is used.

FIG. 11 is a view that shows a power supply connector 600A that is configured to transmit information used for determination at the vehicle side using a path that transmits the pilot signal CPLT.

As shown in FIG. 11, in the power supply connector 600A, a connection detection circuit 611A is similar to that of the charging cable 400 shown in FIG. 2, and further includes a CPLT unit 630 that is coupled to the control pilot line L1 at the side of the vehicle 100 when the power supply connector 600A is connected to the inlet 220.

The CPLT unit 630 is also coupled to the connection signal line L3. When the power supply connector 600A is connected to the inlet 220, a voltage divided by the combined resistor is supplied from the power supply node 350 at the side of the vehicle 100 to the CPLT unit 630. By so doing, the CPLT unit 630 starts up. In this way, when a voltage supplied from the vehicle 100 is used as a power supply voltage of the CPLT unit 630, it is desirable that it is not necessary to include a power supply, such as a battery, exclusive to the CPLT unit 630 in the power supply connector 600A. Note that, in this case, the resistors that constitute the combined resistor are appropriately selected to have resistance values such that the potential at which the CPLT unit 630 may be driven is ensured even when the potential of the connection signal line L3 fully decreases.

Then, the CPLT unit 630 provides a signal for performing the power supply operation and a signal for allowing a start of the engine 160 to the CPU 310 of the vehicle 100 via the control pilot line L1. These signals are different from the pilot signal CPLT used at the time of the charging operation, and, specifically, oscillating signals that are different in oscillating frequency, potential or duty ratio from those of the charging operation.

Note that, in the charging/power supply cable 400B shown in FIG. 7 and FIG. 8 as well, instead of changing the connection detection circuit, it is applicable that the pilot signal CPLT from the CCID 430 is set in a different signal state between the charging operation and the power supply operation to switch between the charging operation and the power supply operation and provide information about whether a start of the engine 160 is allowed as in the case of the power supply connector 600A shown in FIG. 11. In this case, for example, it is applicable that the selector switch 416 is provided on the CCID 430 to switch the oscillating frequency, or the like, of the pilot signal CPLT with the use of the CCID control unit 460 (FIG. 2) in response to switching of the selector switch 416.

Fourth Embodiment

Figure 12:
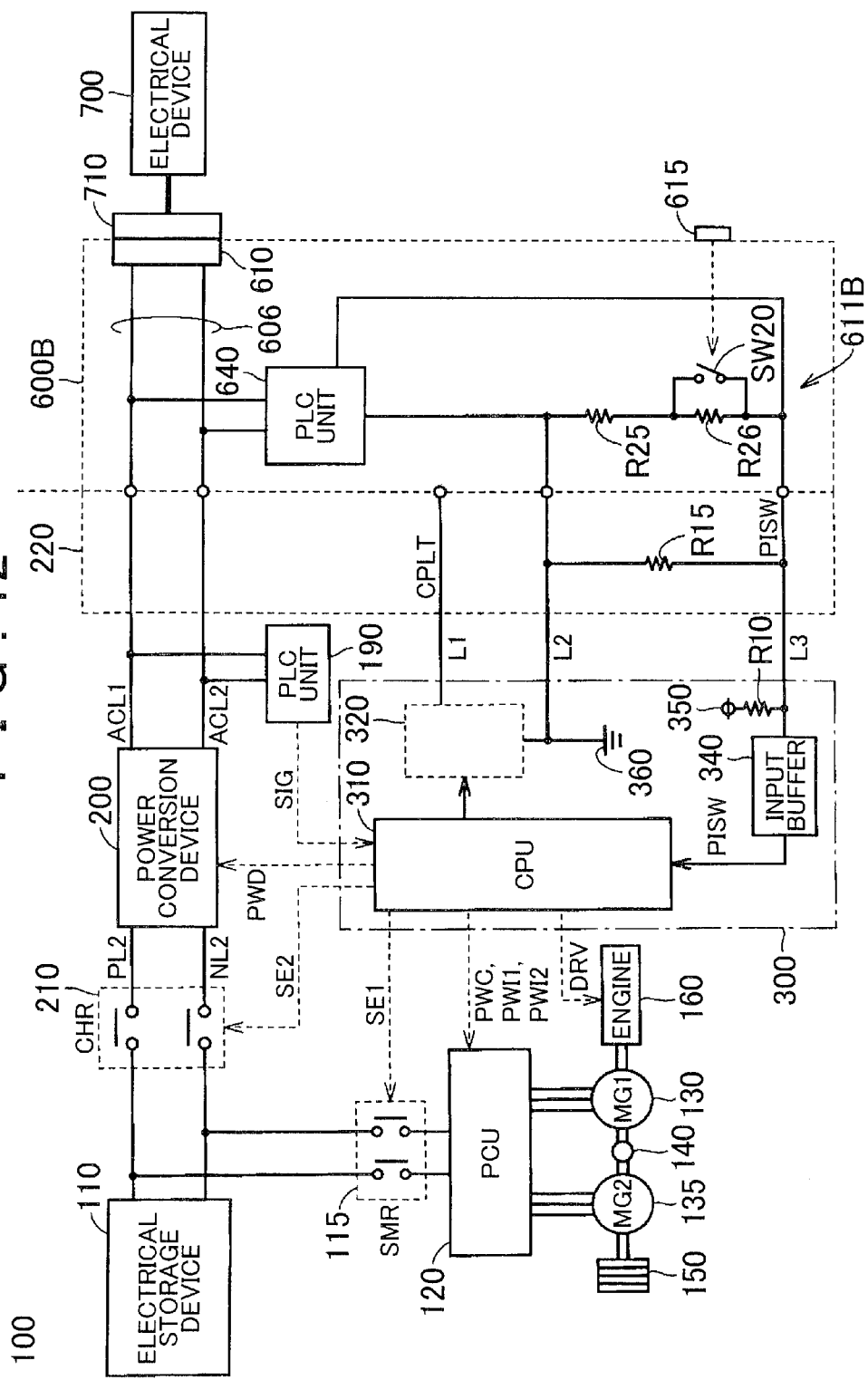
FIG. 12 is a block diagram for illustrating a power supply operation in the case where a power supply connector according to a fourth embodiment is used.

FIG. 12 is a view that shows a power supply connector 600B that is configured to transmit information used for determination at the vehicle side via a power line using power line communication (PLC).

As shown in FIG. 12, in the power supply connector 600B, a connection detection circuit 611B is similar to that of the charging cable 400 shown in FIG. 2, and further includes a PLC unit 640. The PLC unit 640 is coupled to the power transfer unit 606 that connects the vehicle-side power lines ACL1 and ACL2 to the output portion 610, and exchanges information via a power line with a PLC unit 190 provided on the vehicle 100.

The PLC unit 640 is coupled to the connection signal line L3, and, as in the case of the third embodiment, is supplied with a voltage divided by the combined resistor from the power supply node 350 at the side of the vehicle 100 as a power supply voltage.

With the above configuration, when the power supply connector 600B is connected to the inlet 220, the PLC unit 640 is started up, and a signal for performing the power supply operation and a signal for allowing a start of the engine 160 are transmitted by the PLC unit 640 to the PLC unit 190 at the side of the vehicle 100. The PLC unit 190 at the side of the vehicle 100 outputs these received signals SIG to the CPU 310.

Note that, in the charging/power supply cable 400B shown in FIG. 7 and FIG. 8 as well, as in the case of the power supply connector 600B, instead of changing the connection detection circuit, it is applicable that the PLC unit 640 is included to switch between the charging operation and the power supply operation and provide information about whether a start of the engine 160 is allowed. In this case, the selector switch 416 is switched to "emergency" to thereby transmit the signal for performing the power supply operation and the signal for allowing a start of the engine 160 from the PLC unit 640 to the side of the vehicle 100.

Note that the "connection detection circuit", the "CPLT unit 630" and the "PLC unit 640" are examples of a "signal output unit" according to the aspect of the invention.

The embodiments described above are illustrative and not restrictive in all respects. The scope of the invention is defined by the appended claims rather than the above description. The scope of the invention is intended to encompass all modifications within the scope of the appended claims and equivalents thereof.

What is claimed is:

1. A power supply connector that is used at the time when electric power from a vehicle is supplied to a device outside of the vehicle via a connecting portion provided on the vehicle, wherein the vehicle includes: an engine; a rotating electrical machine driven by the engine to generate electric power; and a controller that controls a power supply operation to the device outside of the vehicle,
   the power supply connector comprising:
   a power transfer unit that transfers electric power from the vehicle; and
   a signal output unit that outputs a signal to the controller when the power supply connector is connected to the connecting portion, said signal causing the vehicle to perform the power supply operation while allowing operation of the engine.

2. The power supply connector according to claim 1, wherein
   the vehicle further includes an electrical storage device, and
   the controller supplies the device outside of the vehicle with at least one of electric power from the electrical storage device and the electric power generated by the rotating electrical machine.

3. The power supply connector according to claim 2, wherein
   the signal output unit outputs a signal for prohibiting the operation of the engine to the controller, when the vehicle is caused to perform the power supply operation using only the electric power from the electrical storage device.

4. The power supply connector according to claim 2, wherein
   the vehicle is able to charge the electrical storage device with electric power outside of the vehicle via a charging cable connected to the connecting portion, the controller recognizes that a charging connector of the charging cable is connected when the charging connector is connected to the connecting portion and a first resistor provided in the charging connector is coupled to a signal path, said signal path receives a signal indicating that the charging connector is connected, the signal output unit includes a second resistor having a resistance value different from a resistance value of the first resistor, the second resistor is coupled to the signal path when the power supply connector is connected to the connecting portion, and the controller switches between the power supply operation and a charging operation based on a potential of the signal path.

5. The power supply connector according to claim 4, wherein respective resistance values of two resistors that constitute the first resistor are different from respective resistance values of two resistors that constitute the second resistor, and the sum of the respective resistance values of the two resistors that constitute the first resistor is substantially equal to the sum of the respective resistance values of the two resistors that constitute the second resistor.

6. The power supply connector according to claim 4, wherein the controller further determines whether to allow the operation of the engine based on the potential of the signal path.

7. The power supply connector according to claim 2, wherein the vehicle is able to charge the electrical storage device with electric power outside of the vehicle via a charging cable connected to the connecting portion, the controller performs a charging operation based on a pilot signal output from the charging cable, and the signal output unit outputs a signal for performing the power supply operation to the controller via a signal path through which the pilot signal is transmitted.

8. The power supply connector according to claim 7, wherein the signal output unit further outputs a signal, indicating whether to allow the operation of the engine, to the controller via the signal path through which the pilot signal is transmitted.

9. The power supply connector according to claim 1, wherein the signal output unit uses power line communication to output a signal for performing the power supply operation to the controller.

10. The power supply connector according to claim 1, further comprising:

an output portion that allows a power supply plug of an external electrical device to be connected and that transfers electric power supplied from the vehicle to the electrical device.

11. The power supply connector according to claim 1, wherein the vehicle further includes an electrical storage device, the vehicle is able to charge the electrical storage device with electric power outside of the vehicle via a charging cable having a charging connector connected to the connecting portion, the power supply connector is also used as the charging connector, the power supply connector further includes an operating portion, operated by a user, in order to switch between the power supply operation and a charging operation in the vehicle, and the signal output unit outputs any one of a signal for performing the power supply operation and a signal for performing the charging operation to the controller, based on a state of the operating portion.

12. The power supply connector according to claim 1, wherein the power supply connector is connected to one end of a cable and transfers electric power, supplied from the vehicle, to an external electrical device via the cable.

13. The power supply connector according to claim 1, wherein the signal output unit is supplied with a power supply voltage from the vehicle.

14. The power supply connector according to claim 13, wherein the power supply voltage is supplied via a signal path through which the controller receives a signal for detecting whether the power supply connector is connected.

15. A vehicle that is able to supply electric power to an external device, comprising:

a connecting portion that connects a power supply connector for transferring electric power to the external device;

an engine;

a rotating electrical machine that is driven by the engine to generate electric power; and a controller that controls a power supply operation to the external device, wherein the controller supplies the electric power, generated by the rotating electrical machine, to the external device via the connecting portion, when a signal from the power supply connector allows the power supply operation with operation of the engine.

16. The vehicle according to claim 15, further comprising: an electrical storage device, wherein the controller supplies the external device with at least one of electric power from the electrical storage device and the electric power generated by the rotating electrical machine.

17. The vehicle according to claim 15 or 16, further comprising:

a power conversion device that converts alternating-current power, generated by the rotating electrical machine, to direct-current power.

18. The vehicle according to claim 15, wherein the controller determines whether the operation of the engine is required based on a state of the vehicle, and the controller supplies the electric power, generated by the rotating electrical machine, to the external device via the connecting portion, when the operation of the engine is required.

19. The vehicle according to claim 15, further comprising:

an operating member that is operated by a user and that sets a shift range, wherein the controller allows the power supply operation with the operation of the engine, when the shift range is set at a predetermined range, and the controller prohibits the power supply operation with the operation of the engine, when the shift range is set at a range other than the predetermined range.

20. The vehicle according to claim 19, wherein the predetermined range includes a parking range.

21. A control method for a vehicle, which is used to supply electric power from the vehicle to a device outside of the vehicle via a power supply connector connected to a connecting portion provided on the vehicle, wherein the vehicle includes an engine and a rotating electrical machine that is driven by the engine to generate electric power, the control method comprising:
  receiving a signal output from the power supply connector when the power supply connector is connected to the connecting portion;
  generating electric power with the use of the rotating electrical machine driven by the engine based on the signal; and
  supplying the electric power generated by the rotating electrical machine to the device outside of the vehicle via the power supply connector.

* * * * *

UNITED STATES PATENT AND TRADEMARK OFFICE
CERTIFICATE OF CORRECTION

PATENT NO. : 9,434,257 B2
APPLICATION NO. : 14/241523
DATED : September 6, 2016
INVENTOR(S) : Shigeki Kinomura et al.

It is certified that error appears in the above-identified patent and that said Letters Patent is hereby corrected as shown below:

In the Specification

At Column 16, Line 5, change "set "emergency"" to -- set to "emergency" --.

In the Claims

At Column 20, Line 45, Claim 17, change "claim 15 or 16, further" to -- claim 15, further --.

Signed and Sealed this
Thirtieth Day of May, 2017

Michelle K. Lee
*Director of the United States Patent and Trademark Office*